D. Lithgow,
Water Gage.
No. 92,979.  Patented July 27, 1869.
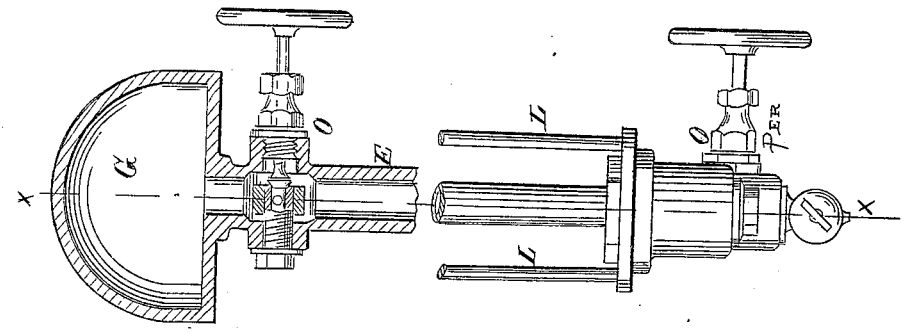
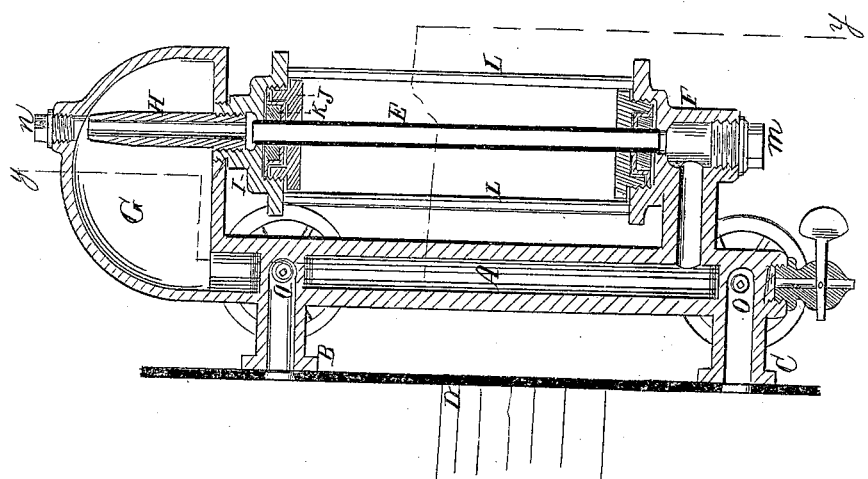
Witnesses:
Chas Nida
O. Hinchman
Inventor:
David Lithgow
Attorneys.

UNITED STATES PATENT OFFICE.

DAVID LITHGOW, OF PHILADELPHIA, PENNSYLVANIA.

IMPROVEMENT IN WATER-GAUGES.

Specification forming part of Letters Patent No. 92,979, dated July 27, 1869.

*To all whom it may concern:*

Be it known that I, DAVID LITHGOW, of Philadelphia, in the county of Philadelphia, and State of Pennsylvania, have invented a new and useful Improvement in Water-Gauge; and I do hereby declare that the following is a full, clear, and exact description thereof, which will enable others skilled in the art to make and use the same, reference being had to the accompanying drawings, forming part of this specification.

This invention relates to a new and useful improvement in water-gauges for steam-generators, and consists in the construction of devices whereby the steam and heat are excluded from the glass gauge-tube, and thereby protecting the glass tube from damage from expansion and contraction by heat.

In the accompanying plate of drawings—

Figure 1 represents a vertical section of the gauge, through the line $x\ x$ of fig. 2.

Figure 2 is a vertical section of fig. 1, through the line $y\ y$.

Similar letters of reference indicate corresponding parts.

A is a vertical tube, in communication with the water and steam spaces of the boiler, by means of the two branch-pipes B C.

D represents the boiler.

E is the gauge-tube.

This tube is made of glass, and is in communication with the water-space of the boiler at its lower end, by means of the branch F, of the tube A.

G is a hemispherical chamber, on the top of the tube A, and consequently in communication with the steam-space of the boiler.

The glass gauge-tube E is in communication with this chamber G, by means of the interior tube H.

I is a flanged tube, screwed into the bottom of the chamber G, to which the top of the glass tube E is securely fastened by the stuffing-box J and elastic packing K. The lower end of the glass tube is connected with the branch F in the same manner.

L represents vertical rods around the glass tube, for protecting it from injury.

O O represent stop-cocks, for excluding steam and water from the tube A.

M is a water-tight screw-plug, in the bottom of the branch F, and N is an air-tight screw-plug in chamber G.

The plug M is placed directly below the glass tube, so that by its removal the tube may be cleaned. The same thing may be done by the removal of the plug N, but this plug may be used for another purpose, as a vacuum will be sometimes, if not always, formed in the boiler by the condensation of steam, the existence of which would defeat my object, but by the removal of the plug N before getting up steam, full atmospheric pressure in the boiler is insured. The plug is securely packed, so that when it is replaced no air can escape.

When steam is generated, the chamber G will be filled, or partially filled with air. Air will at least occupy its upper portion, as the specific gravity of steam is greater than that of air; consequently air alone can enter the gauge-tube, as steam will be below the top of the tube H, through which alone access is gained to the top of the gauge-tube.

Air, under these circumstances, maintains its character as a good non-conductor of heat.

Numerous experiments have proved that with this arrangement the temperature of the gauge-tube would stand at one hundred degrees below the boiling-point of water, while there was a pressure of forty-five pounds in the boiler.

There being no circulation, the temperature of water in the gauge-tube does not vary materially from that of the air in its upper portion.

The glass tube is not, therefore, exposed to fluctuations of temperature, which endangers it from expansion and contraction, and consequently the great and only objection to its general use on steam-boilers is obviated.

Having thus described my invention,

I claim as new, and desire to secure by Letters Patent—

The chamber G, tube H, and glass gauge-tube E, in combination, substantially as and for the purposes described.

DAVID LITHGOW.

Witnesses:
JAMES JONES,
ROBERT LITHGOW.